United States Patent [19]

Rissanen

[11] Patent Number: 5,430,827
[45] Date of Patent: Jul. 4, 1995

[54] PASSWORD VERIFICATION SYSTEM

[75] Inventor: Eugene L. Rissanen, Westerville, Ohio

[73] Assignee: AT&T Corp., Murray Hill, N.J.

[21] Appl. No.: 52,310

[22] Filed: Apr. 23, 1993

[51] Int. Cl.6 .............................................. G10L 9/00
[52] U.S. Cl. .................................... 395/2.82; 395/2.55
[58] Field of Search .................... 395/2.54, 2.55, 2.56, 395/2.59, 2.82, 2.83; 381/42

[56] References Cited

U.S. PATENT DOCUMENTS

| | | | |
|---|---|---|---|
| 4,053,710 | 10/1977 | Advani et al. | 395/2.55 |
| 4,363,102 | 12/1982 | Holmgren et al. | 395/2.55 |
| 4,581,755 | 4/1986 | Sakoe | 381/42 |
| 4,694,493 | 9/1987 | Sakoe | 381/42 |
| 4,910,782 | 3/1990 | Watari | 381/42 |
| 5,127,043 | 6/1992 | Hunt et al. | 381/42 |

FOREIGN PATENT DOCUMENTS 0444351 12/1990 European Pat. Off. .

OTHER PUBLICATIONS

IBM Technical Disclosure Bulletin, vol. 25, No. 11A, Apr. 1983, New York, US, pp. 5448–5452 "Efficient Method for Large Vocabulary Discrete Utterance Recognition".

*Primary Examiner*—Allen R. MacDonald
*Assistant Examiner*—Michael A. Sartori
*Attorney, Agent, or Firm*—Dwight A. Marshall; Charles L. Warren

[57] ABSTRACT

Passwords are spoken by users and stored as speech models in a database. The database also contains a plurality of reference voice (RV) speech models based on speech inputs by various persons; each RV speech model includes characters, digits, or phrases comprising user assigned passwords. Preferably, a group of the RV speech models are selected based upon a predetermined level of difference between same and a speech model of the user's spoken password. In requesting access to the system, a user speaks the assigned password. The password entered by the user to obtain access is compared with user's own speech models and with the selected RV speech models to determine a measure of similarity. The validity of the password is determined based upon this measure of similarity.

12 Claims, 5 Drawing Sheets

DATA BASE

REFERENCE VOICE ~100

| RV | REFERENCE VOICE DATA | SCORES | RANK ORDER |
|---|---|---|---|
| 1 | 0,1,2,···9,"oh" | 33 | 203 |
| ⋮ 3 ⋮ 8 ⋮ | ⋮ | | |
| 20 | 0,1,2,···9,"oh" | 31 | 201 |
| ⋮ 100 ⋮ | ⋮ | | |
| 350 | 0,1,2,···9,"oh" | 32 | 202 |
| ⋮ 510 ⋮ | | | |
| 591 | 0,1,2,···9,"oh" | 31 | 200 |
| ⋮ 700 ⋮ 875 ⋮ 900 ⋮ | | | |
| 1000 | 0,1,2,···9,"oh" | 34 | 204 |

PASSWORD FILE ~101

| USER | PASSWORD | USER'S WORD MODEL | INDEX TO SELECTED RV's | | | | |
|---|---|---|---|---|---|---|---|
| 0001 | 73198 | "7","3","1","9","8" | 1 | 20 | 350 | 591 | 1000 |
| ⋮ | | | | | | | |
| N | 14038 | "1","4","0","3","8" | 43 | 487 | 810 | 325 | 692 |

PASSWORD VERIFICATION SYSTEM

TECHNICAL FIELD

This invention relates to spoken password systems and in particular to a technique for verifying user dependent passwords.

BACKGROUND OF THE INVENTION

Computer systems are increasingly being used in the work place to prepare and store documents of a sensitive nature relating to business operations. Due to the sensitive nature of business operations, it is often necessary that users of a computer system and calling telephone parties accessing a computer system over the telephone network be assigned unique passwords intended to enable access to the computer system. The use of passwords function both to deny access to the computer system to those that are not assigned passwords and to grant access to a password holder.

Some business computer systems are arranged to initially record and store passwords assigned to users. In response to a prompt by the system for the user's password, the user enters the password onto a keyboard and the system compares the keyboard entered password with the stored passwords and enables the user to access the system when the entered password matches the previously stored password.

In voice operated computer systems used both in business and with computer systems coupled with the telephone network, user passwords are recorded and stored as speech models (voice templates) in a password database of the system for each user's account code (login identification). The word "model" as used herein means any digitized form of a spoken word or composite form of a word repeated a plurality of times. Typically, the computer system prompts the user to enter the user's account code and then prompts the user to enter the assigned password by speaking the password into audio input apparatus of the computer system. The system responds to entry of the spoken password by assembling a speech model of the entered password and comparing it with a previously recorded and stored user password model to determine the validity of the user entered password. In the comparison process the user entered password model is compared with each previously recorded and stored password model. Typically, a score is assigned to such comparison representing the similarity of the user entered password model with the pre-recorded and stored password model. When there is a match of the user entered password model with a previously recorded stored password model as determined by a score above a predetermined threshold, the system recognizes the user spoken password as valid and grants the user access to the system.

A problem arises with present speech password systems in that inflections and changes occur from time-to-time in users' voices and to speech transmission characteristics of the system. The variations cause errors when an undesired mismatch occurs due to a comparison of a speech model of a valid, but changed, password to the prerecorded password model. This results in the system denying an authorized user access to the system. Accordingly, a need exists for an improved password validation system that can recognize valid speaker dependent authorized passwords even when different voice inflections occur and where system transmission characteristics cause variations of the received voice password.

Solution

It is an object of the present invention to provide an improved password validation method and apparatus which provides flexibility in recognizing valid spoken passwords while still maintaining authentication accuracy.

In accordance with an embodiment of the preferred invention, a computer controlled database is linked to a telecommunication network with which users are provided password controlled access. Users are initially entered into a password database stored in the computer system by assigning each user an account code and a password, such as consisting of a number of numerical digits. A speech model of the user's password based on the user's voiced entry of the password is stored in the database along with the user's account code.

The computer database contains a reference voice table consisting of prerecorded inputs by a plurality of people who have spoken each of the permissible numeric digits that can be assigned as passwords to users. Voice models of each reference voice for each digit are stored in the database. Upon a new user being assigned a password and voice entry by the user of the password, a model of the user's password is stored in the computer database and is identified by the correspondingly assigned account code. The user's spoken password model is then compared against each of the reference voice models for corresponding digits and assigned a score for each. The reference voice entries are then rank ordered in accordance with the scores reflecting similarity. A plurality, such as five, of the reference voices, preferably having contiguous rank order scores within a predefined range of similarity scores, are selected as comparison models against which models of subsequent spoken passwords will be judged. An index to each of these selected voices is stored in a user data field associated with the corresponding user's password.

Upon a request by a user for access to the system and voicing of a password, the computer system records the voice password. The recorded voice password is compared with the previously selected reference voices to yield a composite first score and is compared with the user's own stored password model to yield a second score. If the difference between the first and second scores exceed a predetermined threshold, entry of a valid password is determined.

DETAILED DESCRIPTION

Figure 1:
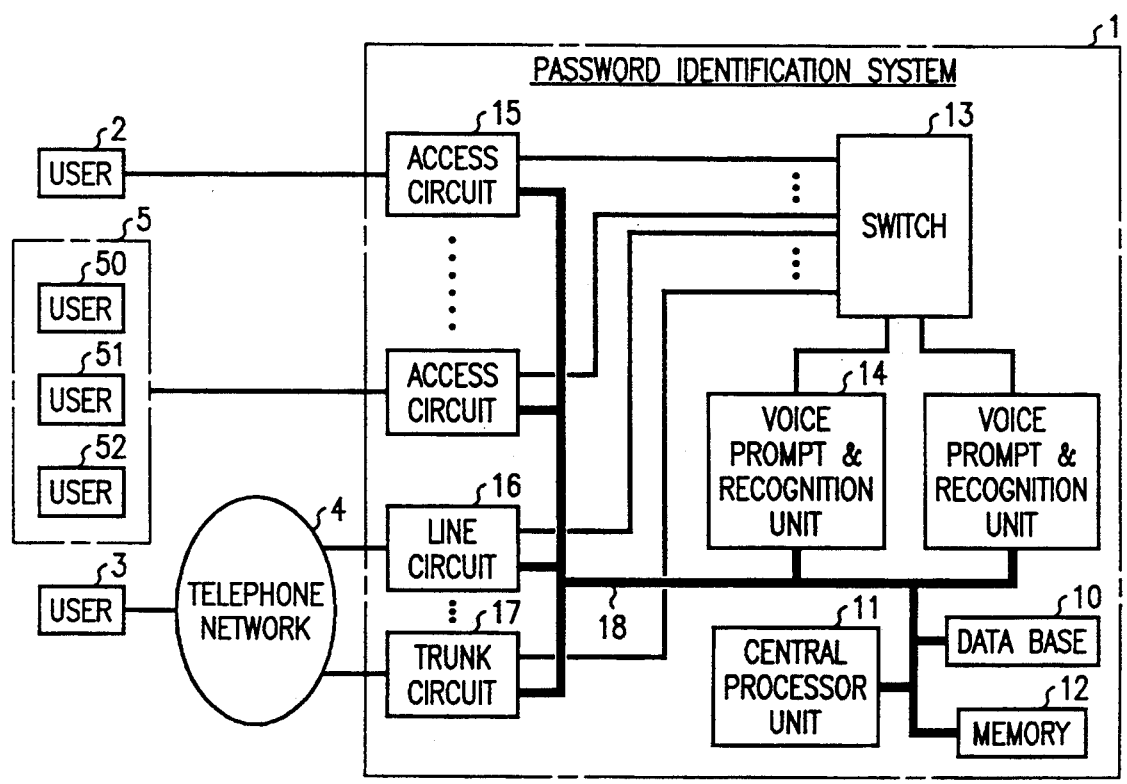
FIG. 1 illustrates a password validation system which incorporates an embodiment of the present invention.

In an exemplary embodiment of the invention, a password identification system 1 shown in FIG. 1 is intended for use in a wide variety of applications to restrict user access to computer systems and to the physical facilities and services provided to certain users by the system. In one application, a computer system serves a number of users 2 and 3, and stores data files, at least some of which, are restricted for use by users 2 and 3. Each authorized user is identified by a unique account code and corresponding password. In another application, a company 5 may have a number of physical facilities such as private telephone lines which company 5 wants to restrict access to users 50, 51, and 52 who are each given an account code and password that enables access to the physical facilities available for use by the company. In yet another application, a provider of financial services may provide a user electronic access to user account files wherein access to an account file is governed by an account code and unique password assigned to a user.

Password system 1 is capable of enrolling (initially entering) user spoken passwords and subsequently recognizing the passwords when spoken by the same user that previously enrolled the password. Password system 1 has line interface apparatus comprising a plurality of access circuits 15, line circuits 16 and trunk circuits 17, each of which are well known and need not be explained for an understanding of the invention. These circuits interconnect password system 1 with users 2, 3, and 5. Access circuit 15 may be connected with any one of a number of well known voice activated devices that enables users 2 and 5 to directly receive from and enter spoken alphanumeric sounds into password system 1. Line circuits 16 and trunk circuits 17 may be coupled with corresponding line circuit and trunk circuits of telephone switching systems of telephone network 4 and enable a user 3 connected to telephone network 4 to place and receive telephone calls and enter spoken alphanumeric sounds into password system 1.

Each access, line and trunk circuit 15, 16, and 17, respectively, is also coupled to switch 13 and controlled by data bus 18 extending from central processor unit 11. A number of voice prompt and recognition units 14 are each connected with switch 13 and controlled via central processor unit 11 and data bus 18 to generate audio prompt messages used to instruct users 2, 3, and 5 interconnected with access, line and trunk circuits 15, 16, and 17 in the use of password identification system 1 and to prompt calling users 2, 3, and 5 for password information. Each voice prompt and recognition unit 14, which is controlled by central processor unit 11, transmits password information received from users 2, 3, and 5 in response to the generated audio prompt messages over data bus 18 to central processor unit 11. Received password information is recorded under control of central processor unit 11 in database 10. Switch 11, which is interconnected with access, line and trunk circuits 15, 16, and 17, and with voice prompt and recognition units 14, is coupled to central processor unit 11 via data bus 18 and selectively connects ones of voice prompt and recognition units 14 with ones of access, line and trunk circuits 15, 16, and 17, connected with users 2, 3, and 5.

Password system 1 may comprise a general purpose IBM compatible computer, such as a 386 or 486 or an AT&T 3B2-400 or 3B2-310 simplex or duplex computer. Such computers need not be described in detail for an understanding of the invention and in general have a central processor unit 11 and a memory unit 12 each interconnected by address, data and control leads to data bus 18. Data bus 18 enables central processor unit 11 to communicate with each connected element in the operation of password system 1. Central processor unit 11 is programmed in accordance with programs stored in memory 12 to enroll, recognize, and validate user spoken passwords.

Figures 2, 3:
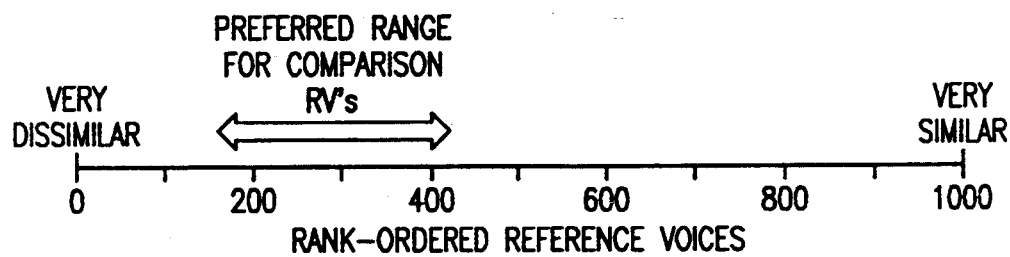
FIG. 2 illustrates an embodiment of a database as shown in FIG. 1.
FIG. 3 is a graph illustrating the relative similarity of reference voices which are preferably selected for comparison with each password.

Referring to FIGS. 1 and 2, the illustrative speech password system 1 records and stores in database 100 included in database 10 a plurality of speech models corresponding to strings of predefined spoken numerals entered by persons into speech password system 1. Although only spoken number models are used in the illustrative embodiment, alphanumeric words and phrases could be used to provide a wider selection of passwords that can be assigned to users. Typically, a substantial number of persons, such as 1000 persons, each record enough speech to allow one speech model of each of the predefined terms (numbers 0–9 and "oh") from microphones of a telephone. The models may be hidden markov, word models and preferably represent at least six representations of each term such as based on six repetitions of each digit by each reference voice contributor. Each model has states symbolically represented as binary configurations and are preferably a combination of multivariate Gaussian distribution of a 24 dimensional vector of 12 cepstral coefficients and 12 delta cepstral coefficients.

Database 10 may be any one of well known disk, tape, solid state or other type of storage device for storing digital information and is connected to data bus 18 and controlled by central processor unit 11 to store password information received by speech password system 1. In addition to password information, central processor unit 11 is also programmed to control voice prompt and recognition units 14 that are used to prompt users 2 and 3 in the use of speech password system 1 and on entering password information into the system. Typically, such prompt messages may be "Please enter your account code now.", "Please speak the password to be enrolled at this time.", and "What is your password?" and other types of messages.

Referring to FIG. 2, database 10 includes a database 100 which contains reference voice models and related data fields, and a database 101 which contains password files corresponding to each enrolled user. Database 100 stores a plurality of files corresponding to voice entries of persons to be utilized as reference voices for comparisons. In the representation of database 100, rows correspond to files for different reference voice contributors and are identified by a reference voice index (1, 2, 3 . . . 1000) contained in the left-hand column. Each person used as a reference voice speaks each of digits 0–9 and "oh", an alternative for the number zero, a plurality of times into a microphone such as a telephone handset A voice model is stored for each person for each of these entries. In the illustrative example, 1000 reference voice files representing different persons' voices each contain these stored models. The remaining columns in database 100 will be described in conjunction with an explanation of database 101.

Users seeking access through the password system in accordance with the present invention, will typically be assigned an access code such as indicated in the "user" column of the table illustrative of database 101. The user is also assigned in the illustrative embodiment a password consisting of five numbers defined by the "password" column. A model of each user's voice input of each assigned password digit is stored as a "user's word model" for each digit. As part of an initial enrollment or entry into the password system, the user's word models of the assigned password are compared with each of the reference voice models in database 100 and similarity scores are computed for digits in the stored reference voice model that correspond to digits in the password. The similarity scores are indicated by "scores" in database 100; these scores may, for example, be on a scale from 1 to 100 with 100 being a virtual identical match and one an extremely dissimilar match.

As part of the enrollment process following the determination of these scores, each reference voice file is then rank ordered by scores as indicated by the "rank order" column of database 100. The rank order column will consist of entries 1-1000 with 1000 corresponding to the rank order of the highest score (best match) and one corresponding to rank order of the lowest score (worst match).

In the illustrative example, an index is stored in each user password file of database 101 to five previously identified reference voice files in database 100 selected on the basis of rank order. In this example, five reference voices having an approximate 20 percentile rank order (200 of 1000) are selected, i.e. indexes 1, 20, 350, 591, and 1000. These five reference models will be subsequently utilized for password access requests by the user as will be explained below.

FIG. 3 illustrates a graph representing the rank ordering of the reference voice files in database 100 relative to a particular user's model of the user's assigned password. An important aspect of the present invention resides in the recognition that the selection of comparison voices which are not substantially similar to the voice model of the user's password can be advantageously utilized for validation of password requests, especially where variations in the voice response by a valid user or changing system conditions can distort or change the speech characteristics of the user's entry of a correct password. Based on experimental results, it is believed that the selection of reference voices for comparisons considered by rank order should be selected from a group less than 80 percent (800 of 1000) in the illustrated graph and more preferably, less than 50 percent (500 of 1000) such as the illustrated range of slightly less than 20 percent (200 of 1000) to slightly greater than 40 percent (400 of 1000). Advantages of such selected comparison voices will be further explained below.

Figure 4:
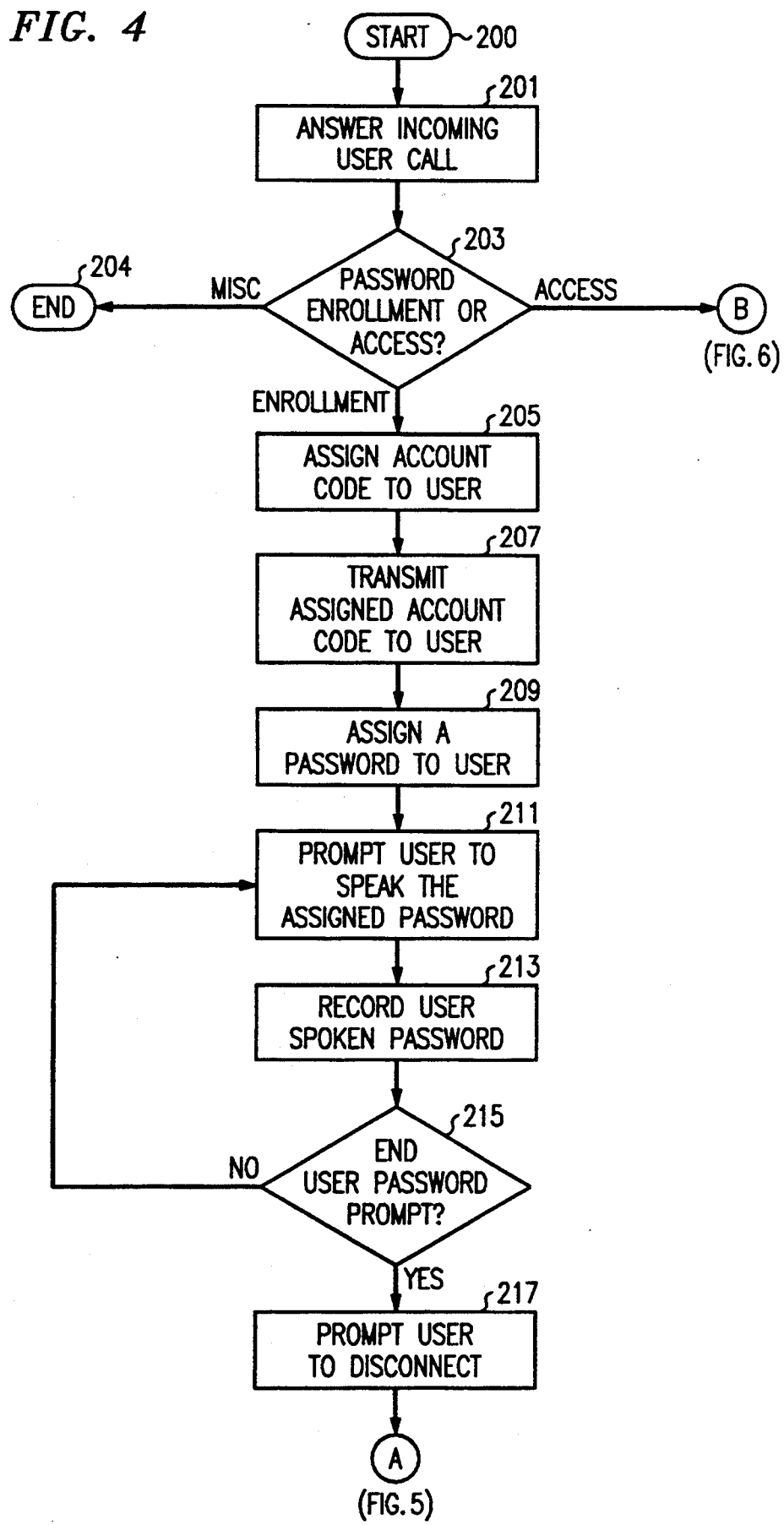
FIGS. 4, 5, and 6 are flow diagrams illustrating exemplary steps of a password validation method used by the system of FIG. 1 in accord with the present invention.

Referring to FIG. 4, the exemplary password method begins at "START" 200 and continues to step 201 with the user's call being answered by password system 1. In step 203 a decision is made if the call is requesting enrollment, i.e. initial entry, of a password, access to password verification, or other service not associated with the password system, i.e. miscellaneous services. This determination can be based on the number dialed, other parameters controllable by the calling party, or a DTMF reply by the calling party to a voice request generated by the system. A determination by step 203 that neither enrollment nor access has been requested, i.e. a miscellaneous request causes the method to terminate at "END" 204. Assuming the decision in step 203 is "enrollment", an account code or personal identification number (PIN) is assigned to the user in step 205 and it is transmitted to the user in step 207. Next a password is assigned by the system under control of the CPU to the user in step 209. The user is requested to speak the assigned password by a voice prompt in step 211. The user's vocalization of the assigned password is recorded (stored) in step 213. In step 215 a determination is made if the user has made an acceptable response to the request. If NO, control returns to step 211 where the user is again prompted to speak the password. It will be noted that steps 211, 213, and 215 may be repeated a predetermined number of times to store a plurality of vocalization of the same password by the user in order to derive a composite or average vocalization of the password. A YES decision in step 215 results in a disconnect message being sent to the user as indicated in step 217.

Figure 5:
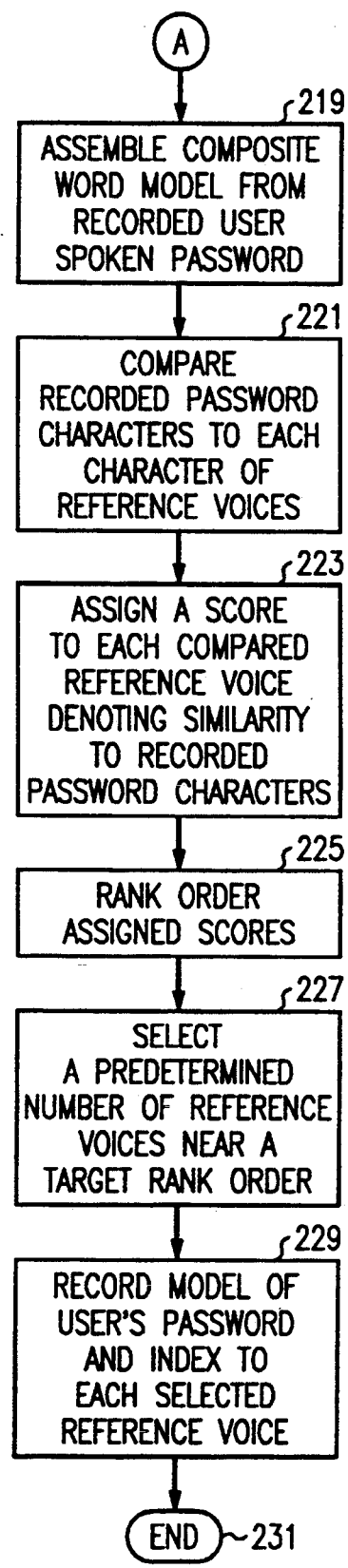

Continuing with the password enrollment in FIG. 5, the CPU of the system 1 assembles in step 219 a composite model based on the stored vocalization(s) of the password by the user. In the illustrative example, the recorded model of the password numbers are then compared with the voice models for corresponding numbers of each of the reference voice files in step 221. A score is assigned to each reference voice file based on similarity of the reference voice and user's models of corresponding voiced numbers in step 223. The scores are then rank ordered as indicated in step 225. For a database containing 1000 reference voice files, each file would be assigned a rank between 1000 and 1 with 1000 representing the most similarity. A predetermined number of reference voices, such as five in the illustrative example, ranks near a predetermined target rank order, such as at a 20 percentile rank that would include ranks of 200, 201, 202, 203, and 204, in step 227. The rank order target is preferably selected from a range of 15-50 percentile and more preferably in a 20-40 percentile range. In step 229, the user's password model and index to each selected reference voice are recorded in the user's file in database 101 with the assigned account code and password. Following step 229, this method ends by exiting these steps as indicated by "END" 231.

Figure 6:
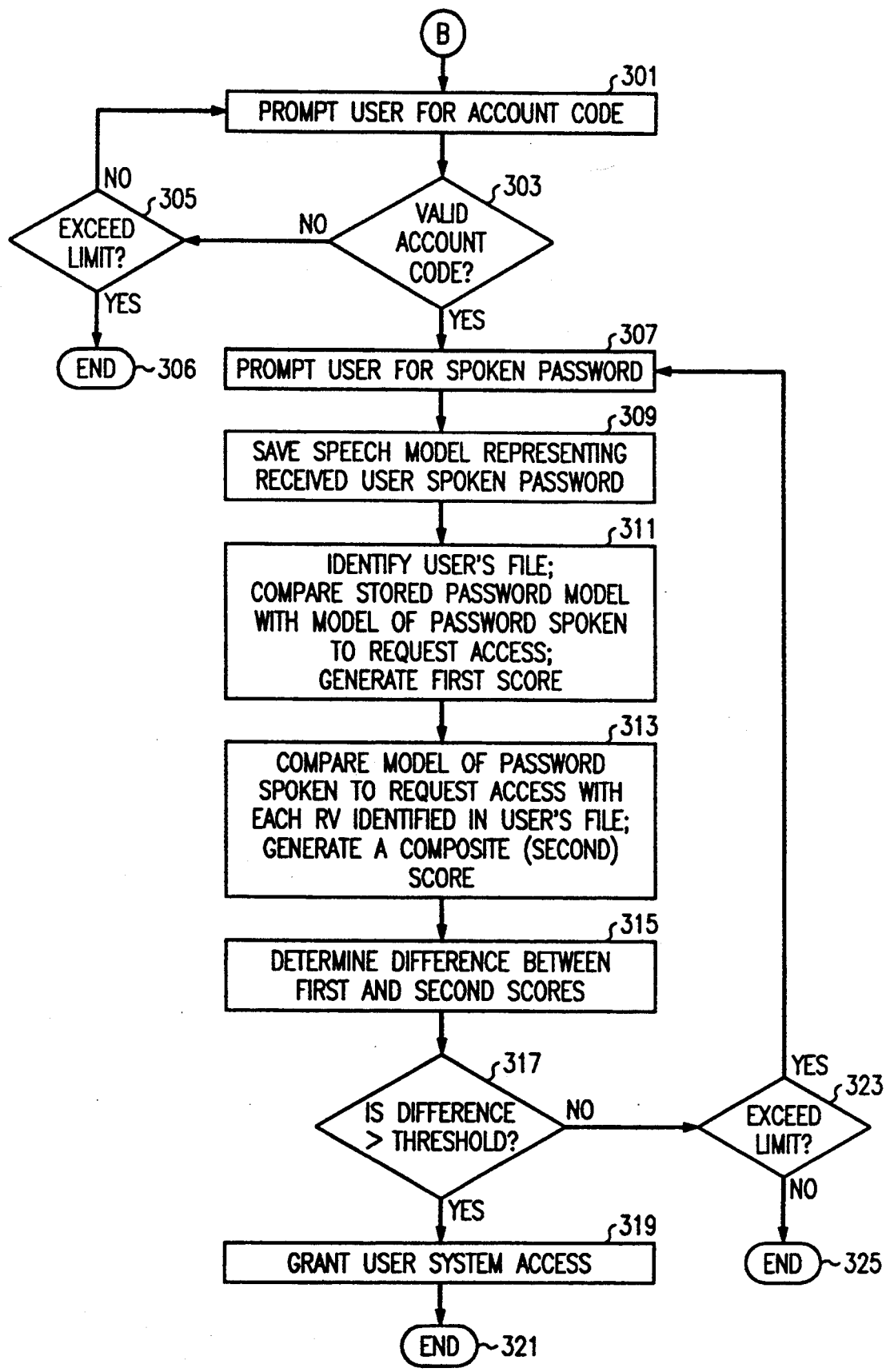

FIG. 6 illustrates a continuation of the flow diagram of an exemplary method in accord with this invention. Upon a decision in step 203 of FIG. 4 that "access" to the system is being requested by a user, the user is prompted in step 301 (FIG. 6) for the user's account code which was assigned to the user as part of the initial password enrollment. Step 303 determines if a valid account code has been given by the user. A NO decision results in step 305 determining if a predetermined number of prior attempts have been exceeded. A YES determination by step 305 causes the process to be terminated as indicated by "END" 306. A NO decision by step 305 which represents that the limit of tries was not exceeded, returns the user to step 301 for another attempt to enter a valid account code. A YES determination by step 303 corresponds to the user having entered a valid account code and is followed by the user being prompted to speak the user's password at step 307. In step 309 a speech model of the password spoken by the user is saved.

In step 311 the user's file in database 101 is identified based upon the user's account code. The user's word model stored in the identified user's file is compared with the model of the password spoken by the user in requesting access, and a first score is generated based upon this comparison. In step 313 a comparison is made of the model of the password spoken to request access to the system with each of the reference voices identified by index in the user's file. A second score is generated based upon a composite of these comparisons, such as by averaging the five scores generated by these comparisons. The difference between the first and second scores is calculated in accordance with step 315. In step 317, a determination is made if the difference determined in step 315 is greater than a predetermined threshold. In a typical example, the first score will have a relatively high degree of similarity since the valid user's entry of the password should relatively closely match the stored voice model of his prior entry of the same password. However, it is expected that the comparison of the user's password with the five reference voices will yield a second score indicative of a relatively poor measure of similarity since each of the reference voices was selected to have a relative low degree of similarity, such as at the 20 percentile rank. Thus, a substantial difference will typically exist between the first and second scores, thereby permitting a reasonable choice of predetermined thresholds upon which to make the determination as indicated in step 317. A threshold can be selected to provide a substantial degree of security while accommodating variations in the voice reply of the user or of system characteristics. For example, a "raspy" pronunciation of the password by a valid user such as due to a sore throat may still possibly be recognized as a valid password entry because it is the difference between the first and second scores which is utilized. In this example, there will be greater variation and, hence a lower first score but likewise there is likely to be a greater variation with regard to the reference voices and, hence a lower second score is also likely. Thus, the differential between the first and second scores may produce a result still high enough to meet the threshold.

Upon a YES determination by step 317, the user is granted system access as indicated in step 319 and this method terminates as indicated by "END" 321. A NO determination by step 317 results in a determination by step 323 as to whether the difference between the first and second scores exceeded at least a lower threshold of limit. If the lower threshold is not exceeded, i.e. a NO determination, the method terminates at "END" 325. A YES determination by step 323 indicating that the lower threshold has been exceeded, the method returns to step 307 and permits the user another attempt to enter the password. This allows the user at least an additional attempt to enter the password where at least the threshold of step 323 was met.

It is believed that the advantages of the present invention can be ascertained from the foregoing description of an embodiment of the invention. The present invention permits a substantial degree of security to be maintained while also permitting speech variations of the entry or transmission of a password to be accommodated by the recognition of the entry as a valid password. An important aspect that contributes to this improved result is the selection of reference voice models as the basis of a comparison which are not substantially similar to the password. In the embodiment of the invention, utilizing scores based upon a comparison of the password entered by a user to gain access with both a stored prior entry of the password by the user and with the preselected reference voices permits appropriate thresholds to be set which expand the tolerance of this system as compared with password systems in which comparisons with closely similar models are utilized.

Although an embodiment of the present invention and a method in accordance therewith have been described above and illustrated in the drawings, the scope of the invention is defined by the claims which follow.

I claim:

1. A spoken password verification apparatus comprising:
   first means for storing a first speech model of a first entry of a password spoken by a user;
   second means for storing a plurality of reference voice (RV) speech models based on speech inputs by persons, each RV speech model including said password;
   means for selecting at least one RV speech model based on a predetermined difference of similarity between said first speech model and said at least one RV speech model, said means for selecting further comprising means for ranking said RV speech models based on said difference of similarity, and wherein said means for selecting selects said at least one RV speech model based on a predetermined threshold from a range of said RV speech model rankings of 15–50 percentile, where a 100 percentile ranking represents a highest ranked RV speech model most similar to said first speech model;
   third means for storing a second speech model of a second entry of said password spoken by said user;
   means for comparing said second speech model and said selected at least one RV model to determine a measure of similarity;
   means for determining validity of said second entry of the password based on said measure of similarity.

2. The spoken password verification apparatus of claim 1 wherein said second means for storing RV speech models further comprises a database having files that each store an RV speech model corresponding to said speech inputs spoken by one of said persons.

3. The spoken password verification apparatus of claim 1 wherein said range of said RV speech model rankings consists of 20–40 percentile.

4. The spoken password verification apparatus of claim 1 wherein said means for determining comprises means for generating a first and second similarity score based on a comparison of said second speech model with said first speech model and with said at least one RV speech model, respectively, another means for comparing a difference between said first and second similarity scores, and said means for determining deciding that the password corresponding to said second speech model is valid if said difference between said first and second similarity scores exceeds said predetermined threshold.

5. A method for verifying a spoken password comprising the steps of:
   storing a first speech model of a first entry of a password spoken by a user;
   storing a plurality of reference voice (RV) speech models based on speech inputs by persons, each RV speech model including said password;
   selecting at least one RV speech model based on a predetermined difference of similarity between said first speech model and said at least one RV speech model, said step of selecting comprising the step of ascertaining a similarity score for each RV speech model by comparing said first speech model with each of said RV speech models;
   storing a second speech model of a second entry of said password spoken by user;
   comparing said second speech model and said selected at least one RV model to determine a measure of similarity;

determining validity of said second entry of said password based on said measure of similarity, said step of selecting said at least one RV speech model further comprising the step of ranking said RV speech models based on said similarity scores, and wherein said selecting step selects said at least one RV speech model based on a predetermined threshold from a range of said RV speech model rankings of 15–50 percentile, where a 100 percentile ranking represents a highest ranked RV speech model most similar to said first speech model.

6. The spoken password verification method of claim 5 wherein said step of storing RV speech models further comprises storing said RV speech models in a database having files that each store an RV speech model corresponding to a person having spoken at least said password.

7. The spoken password verification method of claim 5 wherein said range of said RV speech model rankings consists of 20–40 percentile.

8. The spoken password verification method of claim 5 wherein said determining step comprises the steps of generating first and second similarity scores based on a comparison of said second speech model with said first speech model and with said at least one RV speech model, respectively, comparing the difference between said first and second similarity scores, and determining that the password corresponding to said second speech model is valid if said difference between said first and second similarity scores exceeds a predetermined threshold.

9. A password verification system comprising:
a database;
a first speech model of a first entry of a password spoken by a user stored in said database;
a plurality of reference voice (RV) speech models based on speech inputs by persons stored in said database, each RV speech model including said password;
means operating under the control of a computer executing a computer program for selecting at least one RV speech model based on a predetermined difference of similarity between said first speech model and said one RV speech model, said means for selecting comprising means for ranking said RV speech models based on said difference of similarity and wherein said means for selecting selects said at least one RV speech model based on a predetermined threshold from a range of said RV speech model rankings of 15–50 percentile, where a 100 percentile ranking represents a highest ranked RV speech model most similar to said first speech model;
a second speech model of a second entry of a password spoken by a user stored in said database;
means operating under the control of said computer executing said computer program for comparing said second speech model and said selected one RV model to determine a measure of similarity;
means operating under the control of said computer executing said computer program for determining the validity of said second entry of said password based on said measure of similarity.

10. The password system of claim 9 wherein said database includes files that each store an RV speech model corresponding to a person having spoken at least said password.

11. The password system of claim 9 wherein said range of said RV speech model rankings consists of 20–40 percentile.

12. The password system of claim 9 wherein said determining means comprises means operating under the control of said computer executing said computer program for generating first and second similarity scores based on a comparison of said second speech model with said first speech model and with said at least one RV speech model, respectively, means operating under the control of said computer executing said computer program for comparing the difference between said first and second similarity scores, and said determining means determining that the password corresponding to said second speech model is valid if said difference between said first and second similarity scores exceeds a predetermined threshold.

* * * * *